Dec. 20, 1927.

C. C. WILSON 1,653,076

STOP MECHANISM

Filed Dec. 22, 1925

Inventor
C. C. Wilson
By Philip A. H. Finell
Attorney

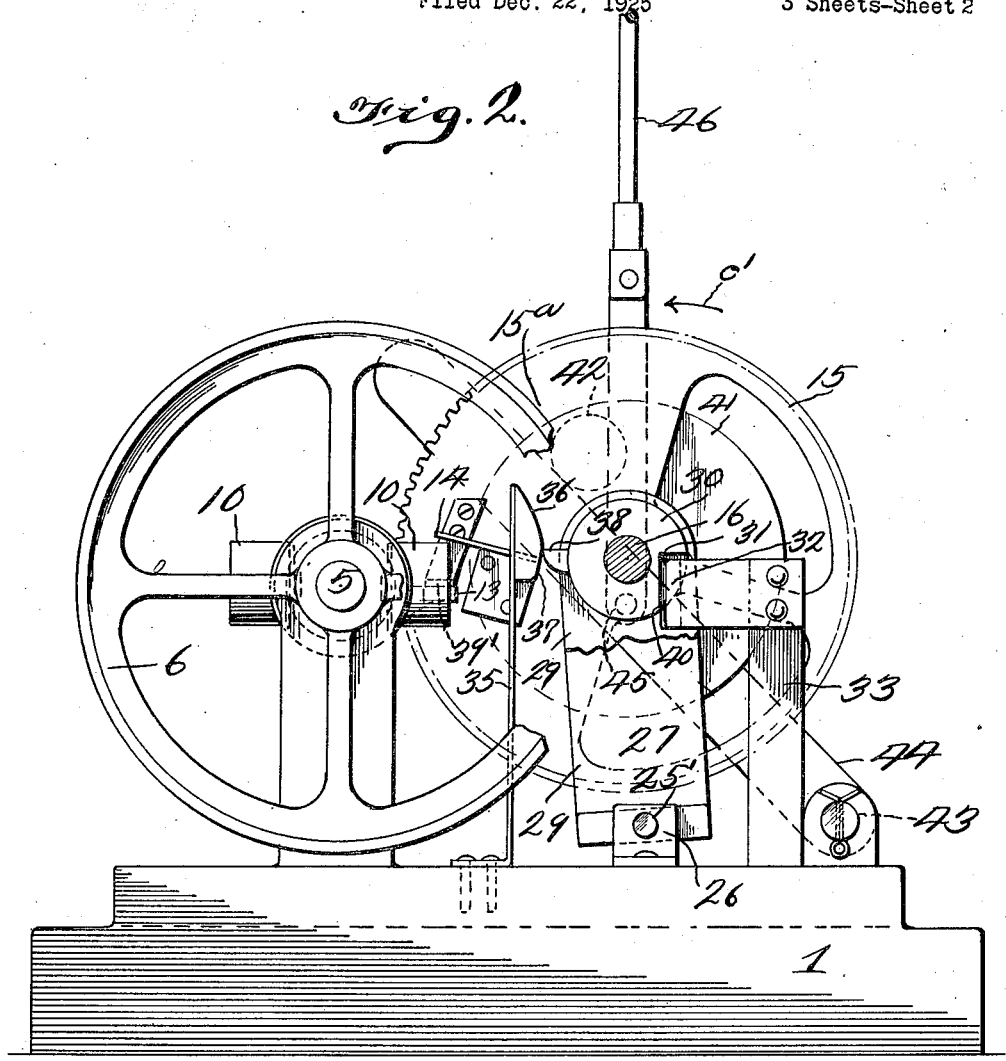

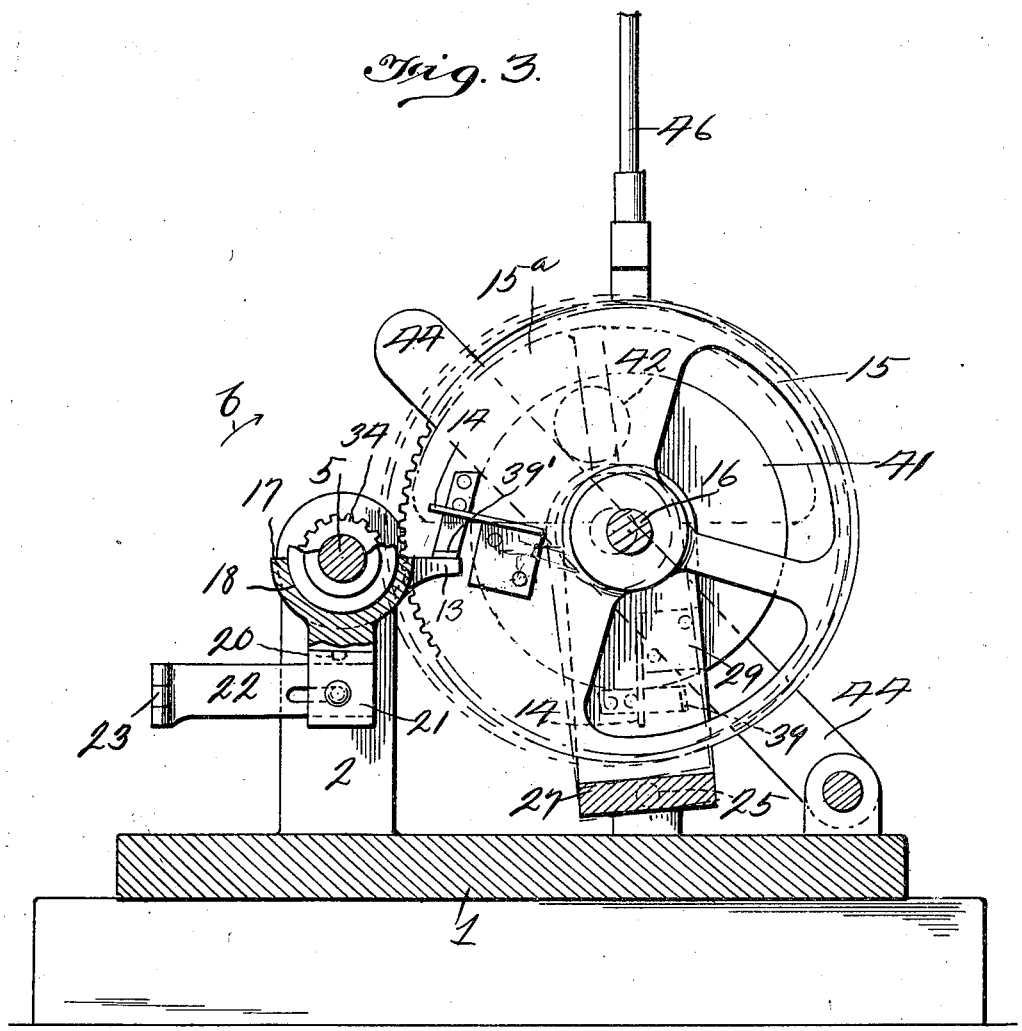

Patented Dec. 20, 1927.

1,653,076

UNITED STATES PATENT OFFICE.

CHARLES CLEVELAND WILSON, OF KINGS MOUNTAIN, NORTH CAROLINA, ASSIGNOR OF ONE-THIRD TO PLATO D. HERNDON AND ONE-THIRD TO BENNETT A. SMITH.

STOP MECHANISM.

Application filed December 22, 1925. Serial No. 77,147.

The invention relates to stop mechanisms particularly adapted for stopping machines, however capable of general application where it is desired to impart a pull upon any object, for instance a belt shifter or a switch.

A further object is to provide a stop mechanism particularly adapted for use in connection with a machine and provided with a rotatable shaft, which is provided with a centrifugal governor which controls longitudinal movement of a stop, carried by a large gear secured to a rotatable countershaft, and which countershaft is mounted on a tiltable bracket, and upon loss of momentum of the rotatable shaft, the governor controlled member is moved out of registration with the gear carried stops, thereby allowing the gear to mesh with a small pinion on the rotatable shaft and the momentum of the rotatable shaft to impart rotation to the countershaft gear. Also to provide the countershaft with a cam cooperating with a stop and spring, which normally maintain the gears out of mesh and a nose carried by the spring and cooperating with the countershaft cam for allowing initial tilting of the pivoted bracket and meshing of the gear and pintle.

A further object is to provide one end of the countershaft with a disc having an eccentrically mounted roller, which roller, upon the rotation of the countershaft engages a pivoted arm, to which a connecting rod is attached, thereby imparting a pull on the connecting rod for operating any desired mechanism, for instance a belt shifter.

A further object is to provide means whereby upon a complete rotation of the countershaft, the countershaft bracket will be tilted away from the rotatable shaft and the gear and pintle moved out of mesh.

A further object is to provide a stop device for use in connection with machinery generally, which stop device, upon loss of power on the machine, will automatically shift the belt drive or a switch which controls the power to the machine to off position, thereby preventing the starting of the machine upon resumption of power, and obviating the present practice upon loss of power in a factory of shifting all the belts for driving the machinery to off positions so that it will not start the machinery or various machines upon resumption of power.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 2 is an end view of the device, part being broken away to better show the structure, and showing the parts in normal position.

Figure 3 is a vertical transverse sectional view taken on line 3—3 of Figure 1.

Figure 1:
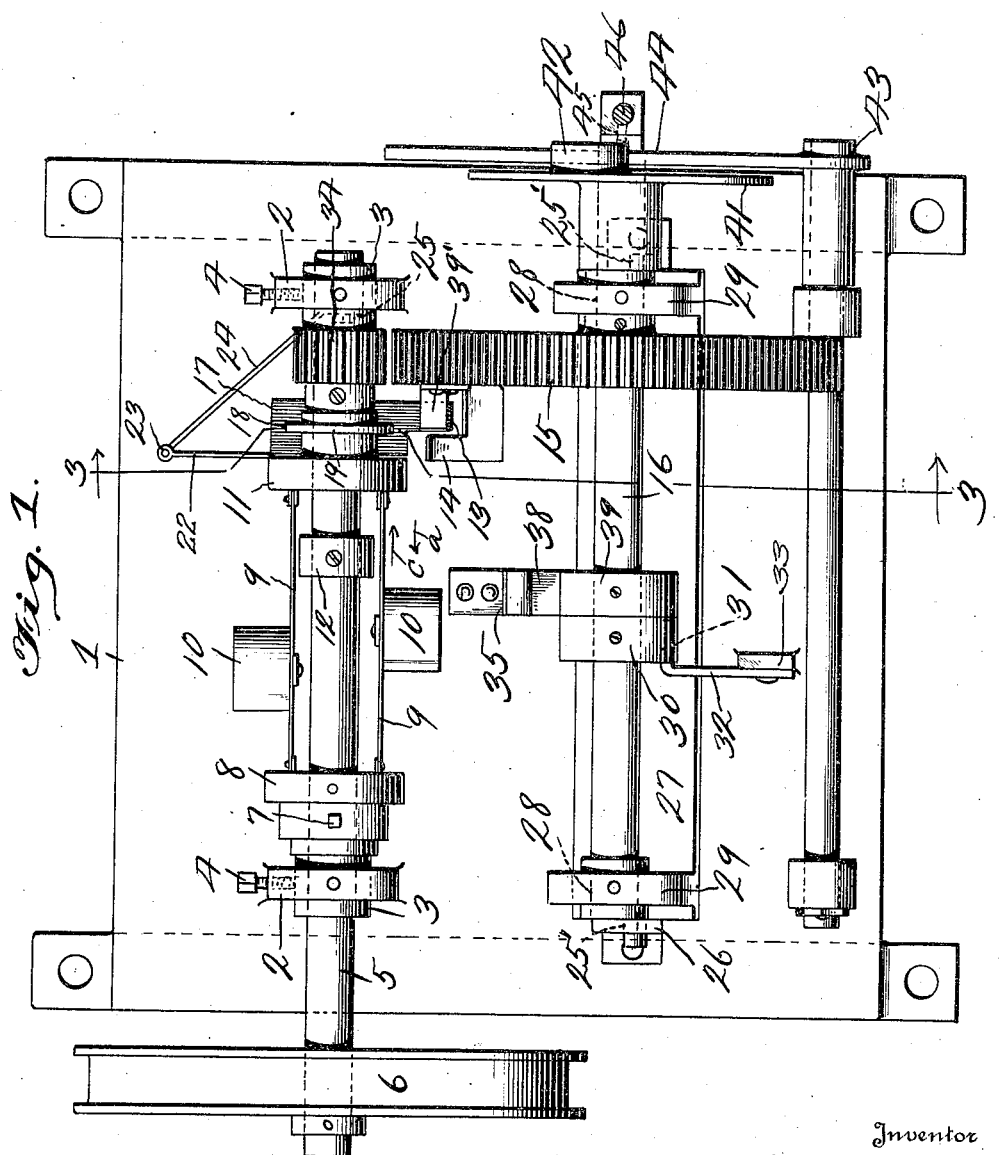
Figure 1 is a top plan view of the device.

Referring to the drawing, the numeral 1 designates the base of the device which is adapted to be secured to a floor or to a support adjacent a machine. Extending upwardly from the base 1 adjacent one side thereof are arms 2, in apertures of which are disposed sleeves 3. The sleeves 3 are securely held in the arms 2 by means of set screws 4. Rotatably mounted in the sleeves 3 is a driven shaft 5, one end of which is provided with a pulley 6, over which a belt is adapted to extend and which belt is adapted to extend over a pulley of any kind on a driven portion of a piece of machinery to be controlled, however any other kind of driving connection between the machine to be controlled and the device may be used. By providing the sleeves 3, the shaft 5 and its mechanism may be easily shifted longitudinally for removing the shaft as a unit from the arms 2 by simply removing the sleeves 3, which will allow longitudinal manipulation of the shaft and tilting thereof to clear the arms during the removal operation. Secured to the driven shaft 5 by means of a set screw 7 is a collar 8, which collar has secured thereto leaf springs 9, which are provided with weights 10. The springs 9 have their other ends secured to a collar 11 which is slidably mounted on the driven shaft 5, and it will be seen when the driven shaft 5 is rapidly rotated, the weights 10 will be forced outwardly by the centrifugal action, thereby moving the collar 11 in the direction of the arrow $a$, the purpose of which will presently appear. Secured on the driven shaft 5 is a stop collar 12, which will limit the movement of the collar 11 in the direction of the arrow $a$ whereby the stop lug 13, carried by the collar 11 will be prevented from moving beyond registration with the stop finger 14 carried by the large gear 15, which is secured to the tiltable countershaft 16. The stop lug 13 is controlled by the collar 11 and extends inwardly in a horizontal plane from a yoke 17 disposed beneath the driven shaft 5, and in a segmentally shaped channel 18, on which yoke the annular flange 19 of the collar 11 is rotatably mounted, therefore it will be seen that when the collar 11 is moved in the direction of the arrow $a$, the yoke 17 will also move in said direction until the collar 11 engages the collar 12, and at which time the lug 13 will be in the path of the finger 14 of the large gear 15, and in which position the parts remain during the operation of the machine, to which the device is attached. Yoke 18 is pivotally connected at 20 to a member 21, which member is adjustably mounted on an arm 22 which is hingedly connected at 23 to an arm 24, which arm is attached to one of the supporting arms 2 at 25, therefore it will be seen that the arms 22 and 24 will support the yoke 17 during its movement longitudinally in relation to the driven shaft 5, and the hinged connection 23 and pivotal connection 20 will allow freedom of movement of the yoke. It is to be understood that during the operation of a machine the driven shaft 5 is continuously rotated in the direction of the arrow $b$ at all times, and when the machine to which the device is attached, has its power cut off for any reason, for instance by blowing out of a fuse, the mechanism hereinafter set forth is automatically operated as the speed of rotation of the driven shaft 5 diminishes, which will relieve some of the centrifugal force of the weights 10 and will allow the springs 9 to straighten, consequently imparting longitudinal movement on the sleeve 19 and the yoke 17 in the direction of the arrow $c$.

Hingedly connected at 25′ to ears 26 carried by the base 1 is an upwardly and inwardly inclined U-shaped bracket 27, in bearings 28 of the arms 29 on which is rotatably mounted the countershaft 16, and it will be noted by inclining the bracket 27 upwardly and inwardly said bracket will tilt inwardly incident to gravity and incident to the position of the counterweight $15^a$ carried by the gear 15, and which counterweight imparts the initial rotation to the gear 15 and the countershaft 16 when the shaft 16 is released by the movement of the stop lug 13. Mounted on the shaft 16 is a collar 30, which has one of its sides provided with a recess 31, in which recess is normally disposed an arm 32 carried by an arm 33, which extends upwardly from the base 1, and which arm prevents rotation of the shaft 16 and gear 15 in one direction and insures the rotation of the shaft 16 in its proper direction. It will be noted that the gear 15 is disposed to one side of a drive pinion 34 carried by the driven shaft 5, and the countershaft 16 is positioned whereby when the bracket 27 tilts inwardly the gear 15 will mesh with the pinion 34. However the gear 15 is maintained normally out of mesh with the pinion 34 by means of an upwardly extending leaf spring 35, the upper end of which is provided with a cam nose 36, the lower end of which terminates in an inclined portion 39, and under normal conditions when the drive shaft 5 is not rotating the cam nose 38 carried by a collar 37 on the shaft 16 engages the upper end of the inclined surface 37 and forces the bracket 27 outwardly against its gravitational force. When the parts are in the inoperative or normal position shown in Figure 2, and the driven shaft 5 is at rest, the lug 13 carried by the yoke 17 engages under the member 39′ carried by the gear 15, and which member 39′ is spaced below the member 14 and in a vertical transverse plane closer to the gear 15. Upon the starting of a machine, to which the device is belted, the shaft 5 is rotated, and as the speed of rotation of the shaft 5 increases weights 10 move outwardly incident to centrifugal force thereby imparting a pull on the collar 11 and yoke 17 which will move the lug 13 from under the member 39′ carried by the gear 15 thereby allowing the counterweight $15^a$ of the gear 15 to partially rotate the gear 15 in the direction of the arrow $c'$ for imparting rotation to the countershaft 16. As the counterweight $15^a$ starts downwardly the countershaft 16 is partially rotated, thereby moving the cam lug 38 downwardly and the spring arm 35 in combination with the inclined surface 37 will quicken the rotation of the shaft 16, and at the same time the lug 38 will move below the surface 37 and the shoulder 40 of the collar 30 will cooperate with the rigid arm 32, and insure an inward tilting of the bracket 27 incident to gravity, but not to a point where the gear 15 will mesh with the pinion 34. It will be noted that during this movement, as the speed of rotation of the shaft 5 continues the lug 13 will be disposed beneath the stop 14 carried by the gear 15, and at the same time, as long as the machine to which the device is attached, continues to rotate or operate, the gear 15 will be maintained out of mesh with the gear 34. This is the normal position of the parts while the device is in running connection with a machine. However if the machine to which the device is connected should stop operating, for instance upon loss of power where the machine is electrically driven, the shaft 5 will slow up in its rotation which will allow the springs 9 to straighten and force the lug 13 from beneath the member 14 carried by the wheel, thereby allowing the cam action of the shoulder 40 to tilt the bracket 27 inwardly to a position where the gear 15 will be forced into mesh with the pinion 34 and the continued momentum of the driven shaft 5 will cause a complete rotation of the gear 15 until the member 39' again rests on the lug 13 of the slidable yoke 17. The above operation or movement of the lug 13 into the path of the member 39' is caused by the slowing up of the shaft 5 incident to the slowing up of the machine to which the belt is belted, and consequent reduction of the centrifugal force on the weight 10 and the straightening out of the springs 9 which will necessarily move the member 13 under the member 39'. Just before this operation takes place the gears 15 and 34 are moved out of mesh by the outward tilting of the U-shaped bracket 27 incident to the engagement of the lug 38 with the member 36 carried by the spring arm 35 and the balance of the rotation of the gear 15 while out of mesh is caused by the counter weight 15ª carried by said gear 15. The parts are now in their initial position for again starting and in the position shown in the drawing. In other words upon the starting of the rotation of the shaft 5 the centrifugal force of the governor will move the stop lug 13 into the path of the member 14 for allowing escape of the member 39' and as long as the proper centrifugal force is maintained the parts will remain in this position and upon dropping of the centrifugal force stop lug 13 will move towards the gear 15 above the stop member 39' thereby allowing the next operation of the device.

One end of the countershaft 16 is provided with a disc 41 to one side of the axis of which a roller 42 is mounted. Pivotally connected at 43 to the base 1 is an upwardly inclined arm 44, which arm is disposed adjacent the outer face of the disc 41 and below the roller 42, where said roller, during the complete rotation of the gear 15 will engage the upper side of the arm 44 and force the same downwardly. Pivotally connected at 45 to the outer side of the arm 44 is an upwardly extending connecting rod 46, which may be connected to a belt shifter for shifting a belt off a pulley or to a switch, and it is to be understood that the main idea involved at this point is to throw off the operating means for the main machine so that upon resumption of power in a shop the machines will not start until a switch is thrown or a belt shifted onto a drive pulley. Although the device has been described in connection with a belt shift or a switch it is to be understood it may be used in connection with any other stopping mechanism, and applicant does not limit himself to any particular device.

From the above it will be seen that a device is provided which may be used in connection with various kinds of machinery for moving or rendering the machine inoperative at a certain period and said device is applicable to many uses, and the same is simple in construction, positive in its operation, and may be cheaply manufactured and sold.

The invention having been set forth what is claimed as new and useful is:—

1. A stop mechanism comprising a constantly rotated driven shaft, a countershaft, a tiltable bracket supporting the countershaft, a slidable member carried by the driven shaft, governor means controlling said slidable member, a gear carried by the driven shaft, a gear carried by the countershaft and normally out of mesh with the driven shaft gear, a member carried by the countershaft gear and cooperating with the slidable member for holding the countershaft gear normally against rotation and means whereby when the slidable member and the gear carried member are out of registration the gears will be forced into mesh and simultaneously rotated.

2. The combination with a stop device comprising a constantly rotated shaft, a tiltable bracket, a countershaft carried by the bracket, a gear carried by the countershaft, a gear carried by the driven shaft, said gears being normally out of mesh, of a governor carried by the driven shaft, a slidable yoke controlled by said governor, spaced stops carried by the countershaft gear and with which said yoke cooperates, a counter weight carried by the countershaft gear, said governor releasing the counterweight gear upon the slowing down of the driven shaft, a cam lug carried by the countershaft, a spring arm extending upwardly between the shafts, a convexed surface carried by the spring arm and with which the cam lug engages, a cam carried by the countershaft, a stationary member disposed adjacent said cam, said cam forming means cooperating with the stationary member whereby upon release of the countershaft gear the pivoted bracket will be allowed to tilt inwardly and the gears moved into mesh.

3. The combination with a stop mechanism comprising a constantly rotated drive shaft, a countershaft, a tilted bracket in bearings of which the countershaft is mounted, a gear carried by the driven shaft, a gear carried by the countershaft, said gears being normally out of mesh, governor controlled means carried by the driven shaft for holding the countershaft gear against rotation normally, a counterweight carried by the countershaft gear, of means for forcing the countershaft gear into mesh with the drive shaft gear upon release of the countershaft gear by the governor, said means comprising cams carried by the countershaft, a rigid arm to one side of the countershaft and with which one of the cams cooperates for tilting the bracket inwardly, a spring arm disposed at the opposite side of the countershaft, a cam surface carried by said spring arm and with said cam surface one of the cams of the countershaft engages, said cams being positioned whereby upon a partial rotation of the countershaft one cam will be moved out of engagement with the cam surface of the spring arm and the other cam into engagement with the rigid arm.

4. A stop mechanism of the character described comprising a constantly driven shaft, a countershaft, a gear carried by the driven shaft, a gear carried by the countershaft, a governor carried by the driven shaft and cooperating with the countershaft gear for holding the countershaft gear against rotation and also allowing rotation of said gear, a counterweight carried by the countershaft gear and means cooperating with the countershaft whereby upon release of the countershaft gear by the governor, said countershaft will be moved towards the driven shaft and the gears meshed.

5. A stop mechanism of the character described comprising a driven shaft, a countershaft, a gear carried by the driven shaft, a gear carried by the countershaft, a governor carried by the driven shaft, said governor cooperating with the gear carried by the countershaft and holding said gear against rotation normally and allowing rotation of said gear upon the loss of speed of rotation of the driven shaft, a counterweight carried by the gear of the countershaft, means cooperating with the countershaft whereby upon release of the countershaft gear by the governor, said gears will be moved into mesh, and means whereby after a rotation of the countershaft gear said gears will be moved out of mesh.

In testimony whereof I hereunto affix my signature.

CHARLES CLEVELAND WILSON.